United States Patent
Spurlock et al.

(10) Patent No.: US 7,917,955 B1
(45) Date of Patent: Mar. 29, 2011

(54) SYSTEM, METHOD AND COMPUTER PROGRAM PRODUCT FOR CONTEXT-DRIVEN BEHAVIORAL HEURISTICS

(75) Inventors: Joel Robert Spurlock, Portland, OR (US); Craig D. Schmugar, Hillsboro, OR (US); Fraser Peter Howard, Chipping Norton (GB)

(73) Assignee: McAfee, Inc., Santa Clara, CA (US)

( * ) Notice: Subject to any disclaimer, the term of this patent is extended or adjusted under 35 U.S.C. 154(b) by 865 days.

(21) Appl. No.: 11/036,153

(22) Filed: Jan. 14, 2005

(51) Int. Cl.
*G06F 11/30* (2006.01)
*G06F 12/14* (2006.01)

(52) U.S. Cl. .............................. 726/24; 713/188
(58) Field of Classification Search ............... 726/24; 713/188
See application file for complete search history.

(56) References Cited

U.S. PATENT DOCUMENTS

| | | | | |
|---|---|---|---|---|
| 5,319,776 | A * | 6/1994 | Hile et al. | 726/24 |
| 6,185,689 | B1 * | 2/2001 | Todd et al. | 726/25 |
| 7,216,366 | B1 * | 5/2007 | Raz et al. | 726/24 |
| 7,290,282 | B1 * | 10/2007 | Renert et al. | 726/24 |
| 2001/0039579 | A1 * | 11/2001 | Trcka et al. | 709/224 |
| 2003/0079145 | A1 * | 4/2003 | Kouznetsov et al. | 713/200 |
| 2003/0159070 | A1 * | 8/2003 | Mayer et al. | 713/201 |
| 2003/0174841 | A1 * | 9/2003 | Nault et al. | 380/277 |
| 2004/0003284 | A1 * | 1/2004 | Campbell et al. | 713/201 |
| 2004/0015712 | A1 * | 1/2004 | Szor | 713/200 |
| 2005/0005153 | A1 * | 1/2005 | Das et al. | 713/200 |
| 2005/0027686 | A1 * | 2/2005 | Shipp | 707/3 |
| 2005/0120229 | A1 * | 6/2005 | Lahti | 713/188 |
| 2005/0132206 | A1 * | 6/2005 | Palliyil et al. | 713/188 |
| 2005/0183143 | A1 * | 8/2005 | Anderholm et al. | 726/22 |
| 2005/0188272 | A1 * | 8/2005 | Bodorin et al. | 714/38 |
| 2005/0240769 | A1 * | 10/2005 | Gassoway | 713/176 |
| 2006/0037079 | A1 * | 2/2006 | Midgley | 726/24 |
| 2006/0080737 | A1 * | 4/2006 | Freeman et al. | 726/24 |
| 2006/0095964 | A1 * | 5/2006 | Costea | 726/22 |
| 2006/0101263 | A1 * | 5/2006 | Costea et al. | 713/164 |
| 2006/0101264 | A1 * | 5/2006 | Costea et al. | 713/165 |
| 2006/0101282 | A1 * | 5/2006 | Costea et al. | 713/188 |

FOREIGN PATENT DOCUMENTS

WO    WO 03/067810    8/2003

OTHER PUBLICATIONS

U.S. Appl. No. 10/876,524, filed Jun. 24, 2004.

* cited by examiner

*Primary Examiner* — Christian LaForgia
(74) *Attorney, Agent, or Firm* — Zilka-Kotab, PC

(57) ABSTRACT

A system, method and computer program product are provided for detecting unwanted data. A scan for unwanted data is performed to generate results of the scan. A context of the scan is then identified. Further, the presence of unwanted data is conditionally indicated based on both the results of the scan and the context of the scan.

30 Claims, 7 Drawing Sheets

SYSTEM, METHOD AND COMPUTER PROGRAM PRODUCT FOR CONTEXT-DRIVEN BEHAVIORAL HEURISTICS

RELATED APPLICATION(S)

The present application relates to application Ser. No. 10/876,524 filed Jun. 24, 2004, which is incorporated herein by reference for all purposes.

FIELD OF THE INVENTION

The present invention relates to unwanted data (i.e. malware, spyware, etc.) detection/prevention systems, and more particularly to detecting/preventing unwanted data (i.e. malware, spyware, etc.) utilizing heuristics.

BACKGROUND OF THE INVENTION

In the space of just a decade, the Internet, because it provides access to information, and the ability to publish information, in revolutionary ways, has emerged from relative obscurity to international prominence. Whereas, in general, an internet is a network of networks, the Internet is a global collection of interconnected local, mid-level, and wide-area networks that use the Internet Protocol (IP) as the network layer protocol. Whereas the Internet embraces many local- and wide-area networks, a given local- or wide-area network may or may not form part of the Internet.

As the Internet and its underlying technologies have become increasingly familiar, attention has become focused on Internet security and computer network security in general. With unprecedented access to information has also come unprecedented opportunities to gain unauthorized access to data, change data, destroy data, make unauthorized use of computer resources, interfere with the intended use of computer resources, etc. These opportunities have been exploited time and time again.

Many techniques have been used to detect unwanted data and the various related malicious functionality resulting therefrom. For example, name identification may be used to detect a threat specifically based on a file signature. Further, generic identification may be used to detect a threat based on malicious family characteristics (e.g. identifying a bagle variant, etc.). Still yet, "false," or "falsing," refers to the detection of a benign file which is not a threat. Heuristics may be used to detect new threats without name or generic identification. Even still, behavioral heuristics may utilize heuristics which, in turn, use a context of malicious operations to improve detection.

Unfortunately, traditional security solutions are, in large, reactive. For example, file signatures are developed after a threat is perceived. There is thus little technology that can effectively detect and remove new unknown threats without significant risk of incorrectly identifying innocent files, etc.

There is thus a need for overcoming these and/or other problems associated with the prior art.

SUMMARY

A system, method and computer program product are provided for detecting unwanted data. A scan for unwanted data is performed to generate results of the scan. A context of the scan is then identified. Further, the presence of unwanted data is conditionally indicated based on both the results of the scan and the context of the scan.

In one embodiment, the scan may involve comparing incoming data, etc. with a plurality of signatures representative of unwanted data. The results may thus indicate whether a match is found. Such signatures may even include heuristic signatures.

To this end, utilization of the context of the scan may permit a wider range of the heuristic signatures, without substantially increasing instances of false detections, etc. Still yet, the results of the scan and the context of the scan may be used in combination to improve a reliability of the detection of the unwanted data.

In another embodiment, the context of the scan may be identified utilizing a state machine and/or may reflect behavior over time. The context of the scan may also involve at least one file and/or process subject to the scan. Further, the context of the scan may include a registry change, network communication, user information, at least one change to at least one file, and/or information on code execution.

As a further option, the context of the scan may be used to determine a persistence of the unwanted data, a propagation of the unwanted data, and/or a stealth aspect of the unwanted data. Still yet, the unwanted data may include malware, spyware, etc.

Yet another security system, method and computer program product are provided for detecting unwanted data. In use, the behavior of data is first monitored and a context is determined based on the monitoring. Then it is determined whether the data includes unwanted data based on the context. As operation continues, the above mentioned acts are repeated, such that additional determinations of whether the data includes unwanted data may be based on each of the contexts identified from the monitoring.

DETAILED DESCRIPTION

Figure 1:
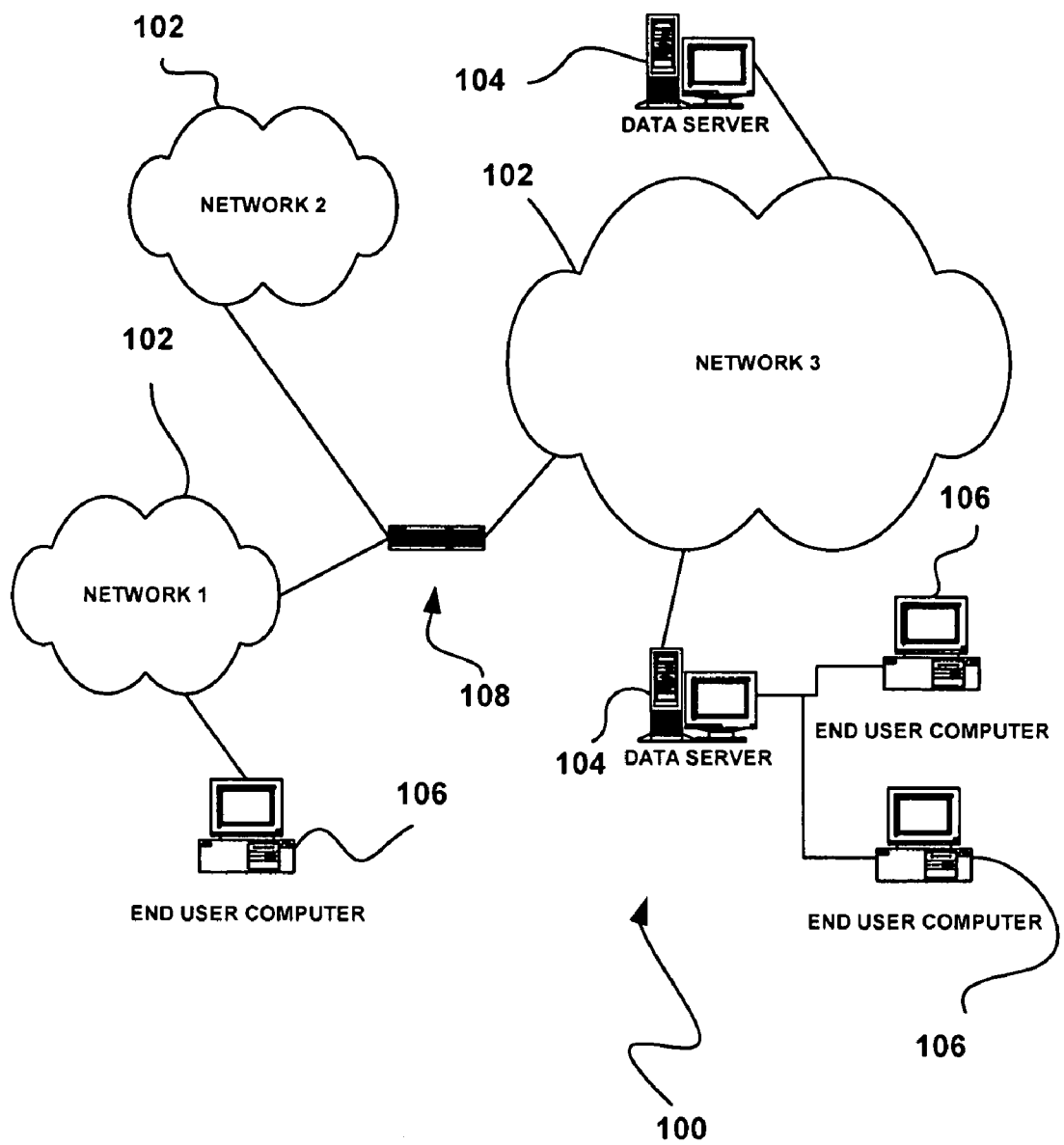
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wide area network (WAN) such as the Internet, etc.

Coupled to the networks 102 are data server computers 104 which are capable of communicating over the networks 102. Also coupled to the networks 102 and the data server computers 104 is a plurality of end user computers 106. In order to facilitate communication among the networks 102, at least one gateway or router 108 is optionally coupled therebetween.

It should be noted that each of the foregoing network devices in the present network architecture 100, as well as any other unillustrated hardware and/or software, may be equipped with various security features. For example, the various data server computers 104 and/or end user computers 106 may be equipped with security functionality in the form of a scanner, a firewall, intrusion detection/previous system, etc. for purposes that will be set forth hereinafter in greater detail.

Figure 2:
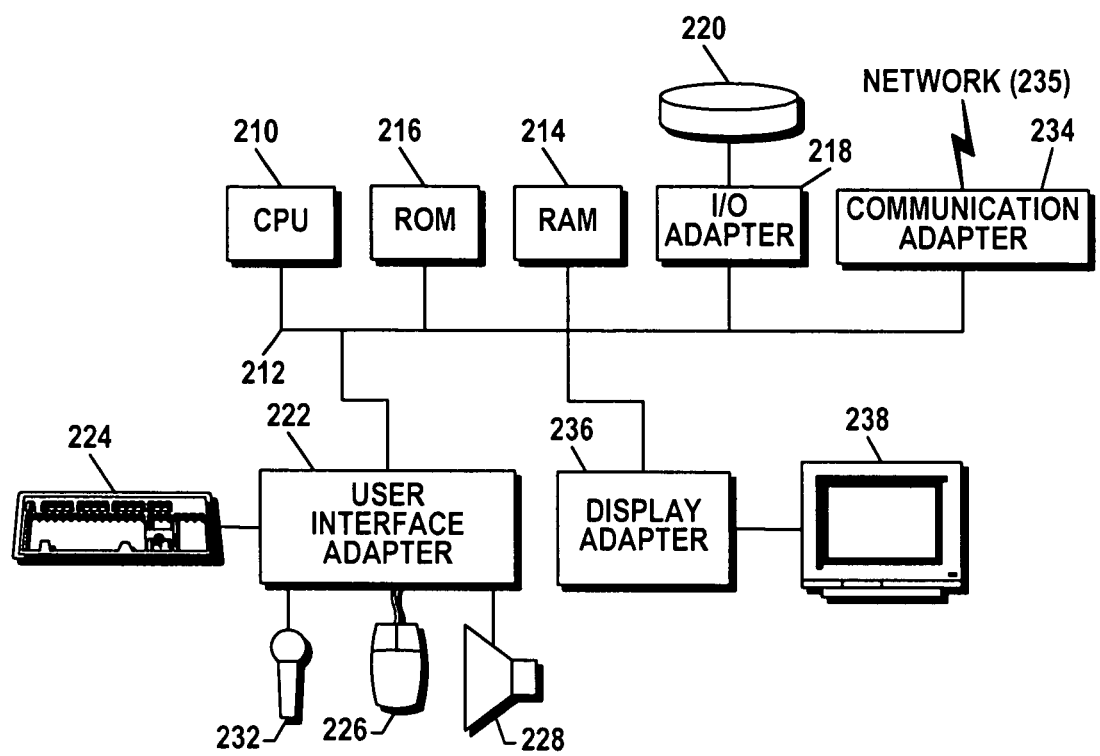
FIG. 2 shows a representative hardware environment that may be associated with the data server computers and/or end user computers of FIG. 1, in accordance with one embodiment.

FIG. 2 shows a representative hardware environment that may be associated with the data server computers 104 and/or end user computers 106 of FIG. 1, in accordance with one embodiment. Such figure illustrates a possible hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Our course, the various embodiments set forth herein may be implemented utilizing hardware, software, or any desired combination thereof. For that matter, any type of logic may be utilized which is capable of implementing the various functionality set forth herein.

Figure 3:
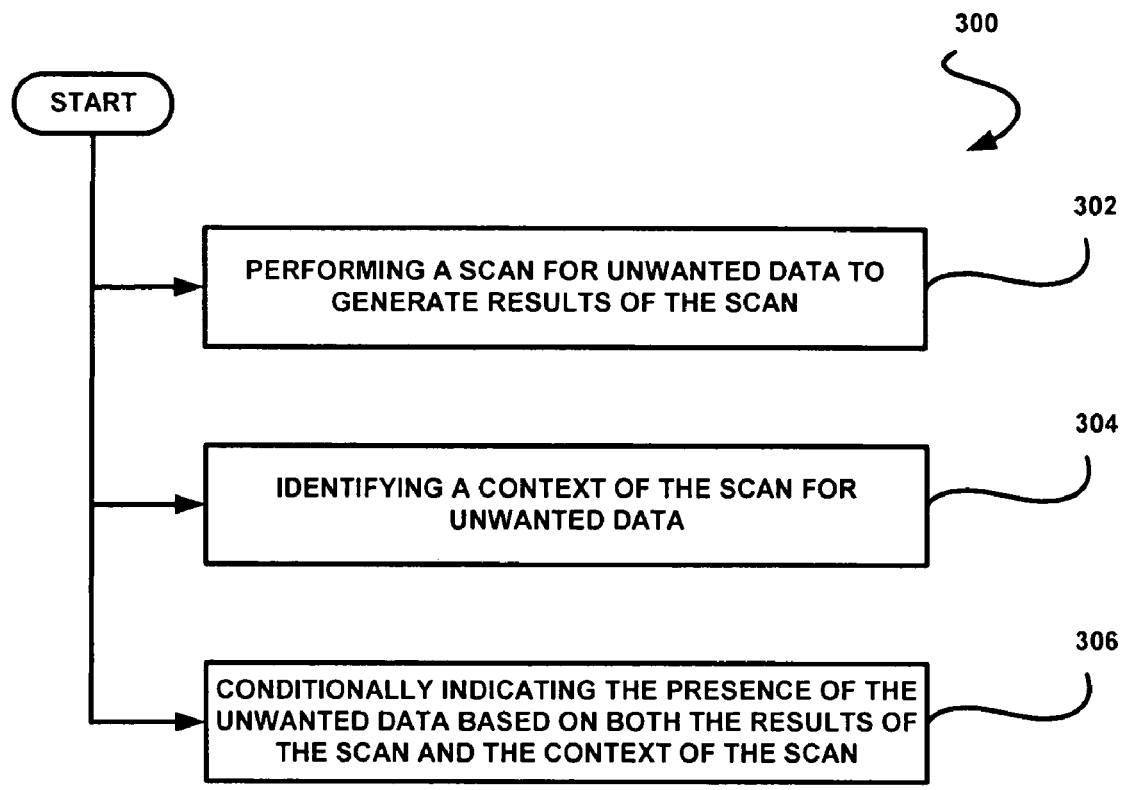
FIG. 3 illustrates a security method for detecting unwanted data, in accordance with one embodiment.

FIG. 3 illustrates a security method 300 for detecting unwanted data, in accordance with one embodiment. As an option, the present method 300 may be implemented in the context of the architecture and environment of FIGS. 1 and/or 2. Of course, however, the security method 300 may be carried out in any desired environment.

As shown, the security method 300 includes a scan for unwanted data to generate results of the scan in operation 302. Unwanted data may include, but is not limited to, data, executable code, non-executable code, unwanted (or even potentially unwanted) programs such as malware, spyware, etc. and/or any other computer and/or network-related entity that is unwanted or potentially unwanted.

In the context of the present description, malware may refer to any programming or files that are developed for the purpose of doing harm to a computer and/or network components. Thus, malware may include, but is not limited to, computer viruses, worms, Trojan horses, etc. Further, a malware family may refer to multiple versions of a file(s) which have similar behavior and classification. Still yet, a variant may refer to individual members of a malware family.

Spyware, while not as malicious as the aforementioned conventional viruses, Trojan horses, etc., may still cause problems for computer users. For example, spyware may be designed to log keystrokes, track which websites a computer user visits, and/or transmit personal information to a third party. In the context of the present description, the term spyware is further deemed to include other related types of similar software such as adware, dialer software, other equivalents, and/or any other software that is less malicious than conventional malware. For example, adware is typically designed to download and display advertisements on a screen of a computer, and can be very intrusive. Dialer software, on the other hand, is designed to redirect a dial-up Internet Service Provider (ISP) connection of a computer to a different, more expensive phone number, in exchange for access to something, typically pornography.

Referring again to FIG. 3, the scan in operation 302 may optionally involve comparing data with a plurality of signatures representative of unwanted data. Such signatures may include, but are not limited to heuristic signatures. The results of the scan in operation 302 may thus indicate whether a match between the signatures and data is found. Of course, in the context of the present description, a scan may refer to any operation that is capable of detecting, at least in part, unwanted data.

The security method 300 also identifies a context of the scan for unwanted data in operation 304. In the present description, such context may include the behavior of files and/or processes over time, or any other contextual information, behavior, surrounding circumstances, conditions, and/or state related to the scan.

Just by way of example, the context may include, but is not limited to, registry changes, network communication, user information, file and/or folder information, processes that act on a file, changes made to a file, code execution, and/or file information and signature detection. In addition, the context may involve processes that open ports, delete pending file renames, copy themselves to startup folders, use specific application program interfaces (API's), write to another process memory area, and any other related processes. Still yet, the context of the scan can be identified by utilization of a state machine, such as anti-virus software. It may also be noted that the identification of the context of the scan for unwanted data can be used to determine a source, persistence, propagation, stealth and/or any other aspect of unwanted data.

Thereafter, the security method 300 conditionally indicates the presence of unwanted data based on both the results of the scan and the context of the scan, as indicated in operation 306. The results of the scan and the context of the scan are used in combination to make the detection of unwanted data more reliable.

To this end, utilization of the context of the scan may permit a wider range of the signatures, without substantially increasing instances of false detections, etc. Still yet, the results of the scan and the context of the scan may be used in combination to improve a reliability of the detection of the unwanted data.

Figure 4:
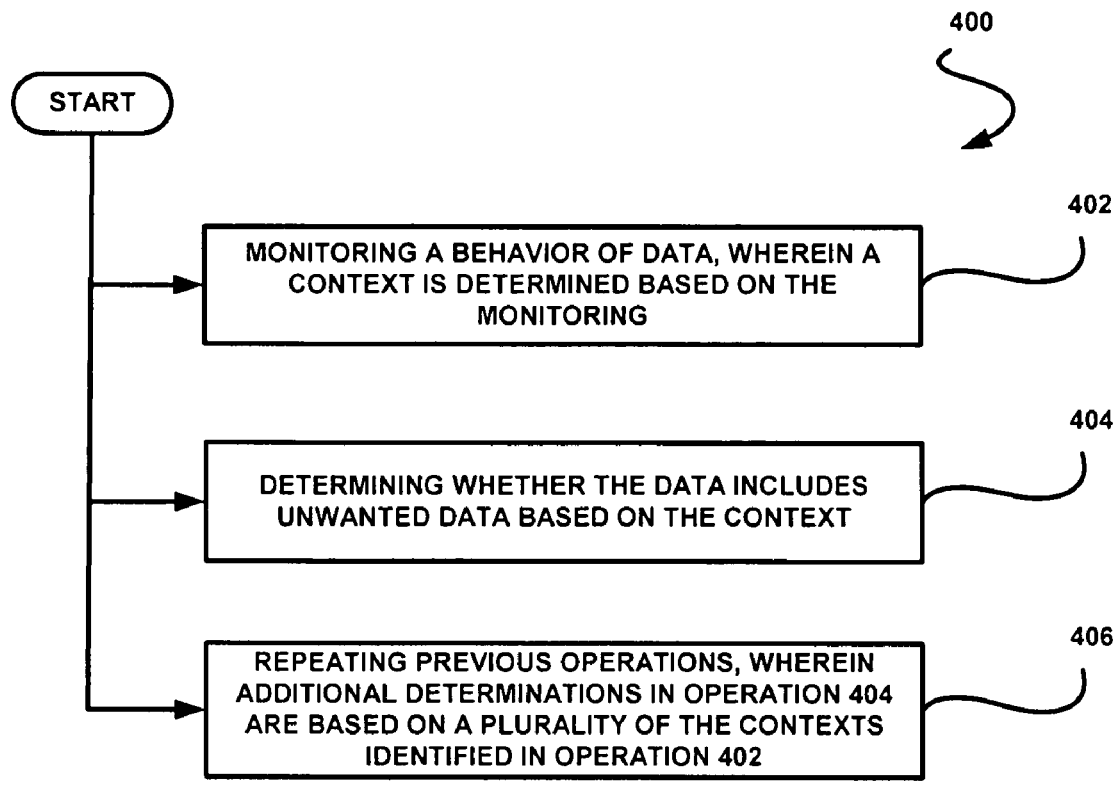
FIG. 4 illustrates a security method for detecting unwanted data, in accordance with another embodiment.

FIG. 4 illustrates a security method 400 for detecting unwanted data, in accordance with another embodiment. As an option, the present security method 400 may be implemented in the context of the architecture, environment and/or context of FIGS. 1, 2 and/or 3. Of course, however, the security method 400 may be carried out in any desired environment and/or context.

The security method 400 for detecting unwanted data includes monitoring the behavior of data, and determining a context based on such monitoring. See operation 402. Strictly as an option, behavioral information that is detected may be given a unique identification (ID) number. In use, such unique ID number may be known by a monitoring component and a monitoring component of any underlying architecture, for reasons that will soon become apparent.

The security method 400 continues by determining whether the data contains unwanted data based on the context, as noted in operation 404. Further, operations 402 and 404 are repeated (as noted in operation 406), such that additional determinations made in operation 404 are based on a plurality of the contexts identified in operation 402. As an option, each of the contexts (previous and present) may be used in all additional determinations made in operation 404.

To this end, the present method 400 is capable of collecting various contexts as each additional monitoring operation takes place. Thus, the method 400 may become "smarter" as the monitoring progresses, thereby improving the detection of unwanted data.

More information on optional details that may or may not be incorporated with the foregoing methods will now be set forth. It should be noted that such details are set forth for illustrative purposes only, and should not be construed as limiting in any manner.

Figure 5A:
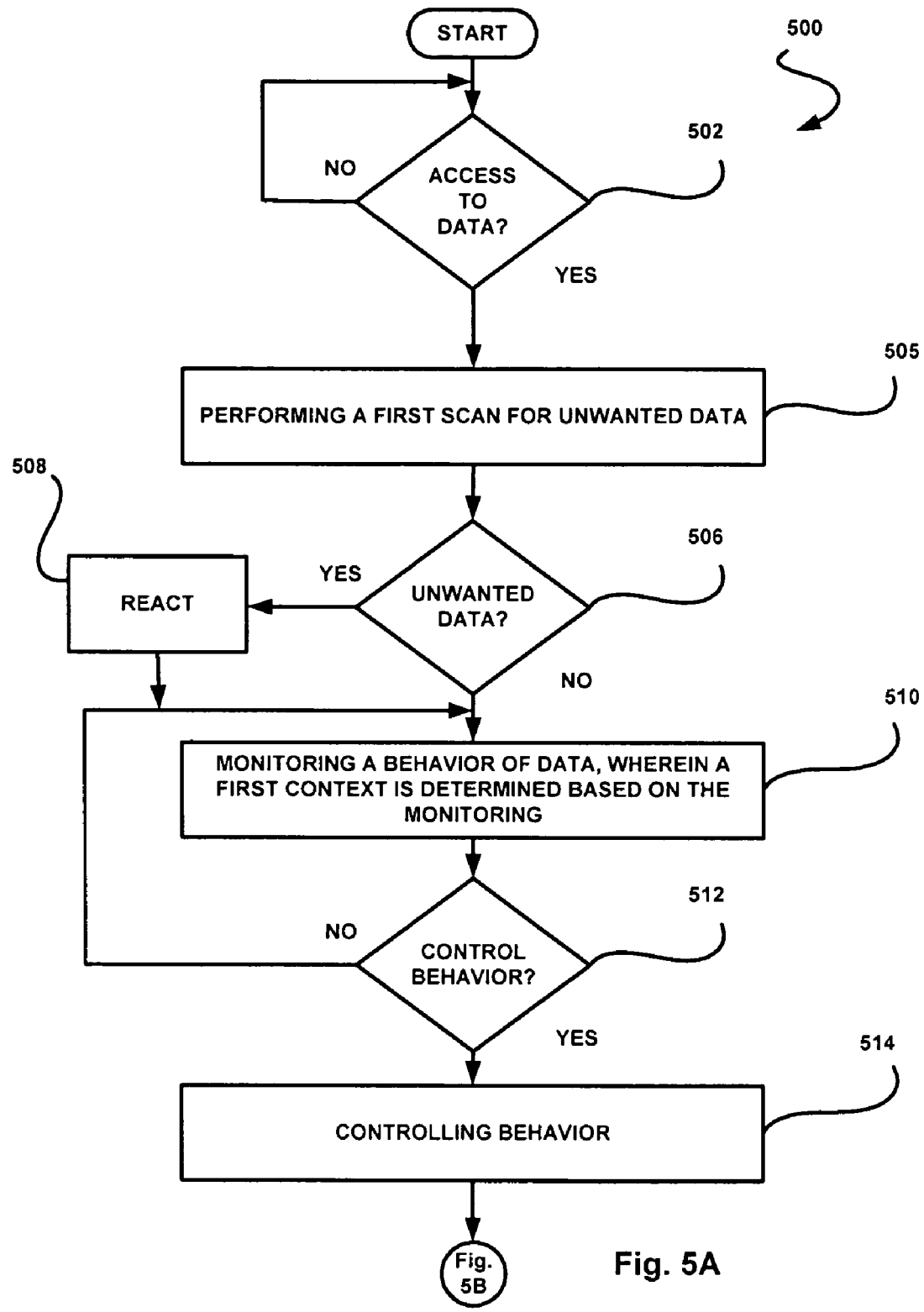
FIGS. 5A-5C illustrate a security method for detecting unwanted data, in accordance with yet another embodiment.
Figure 5B:
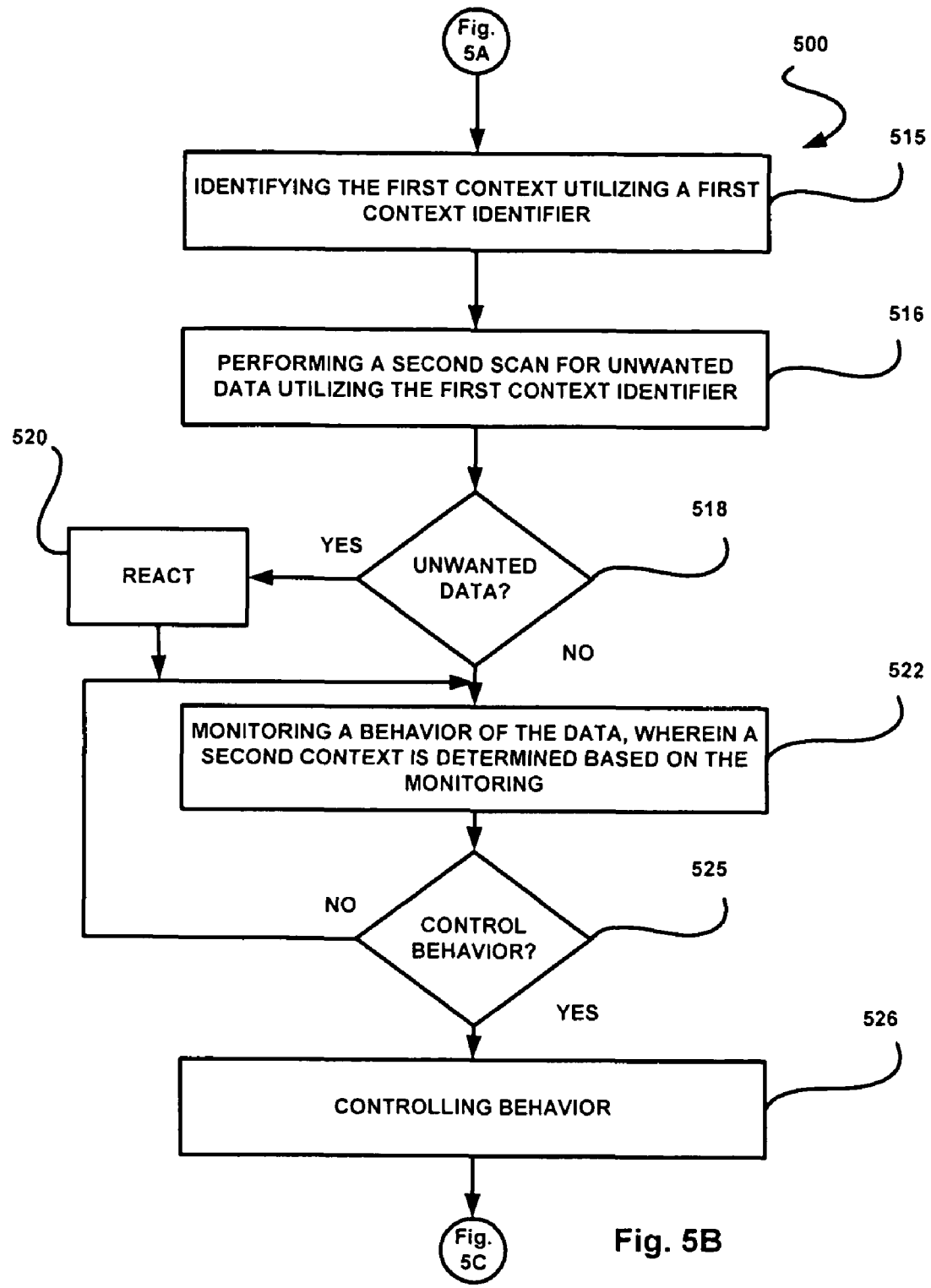
Figure 5C:
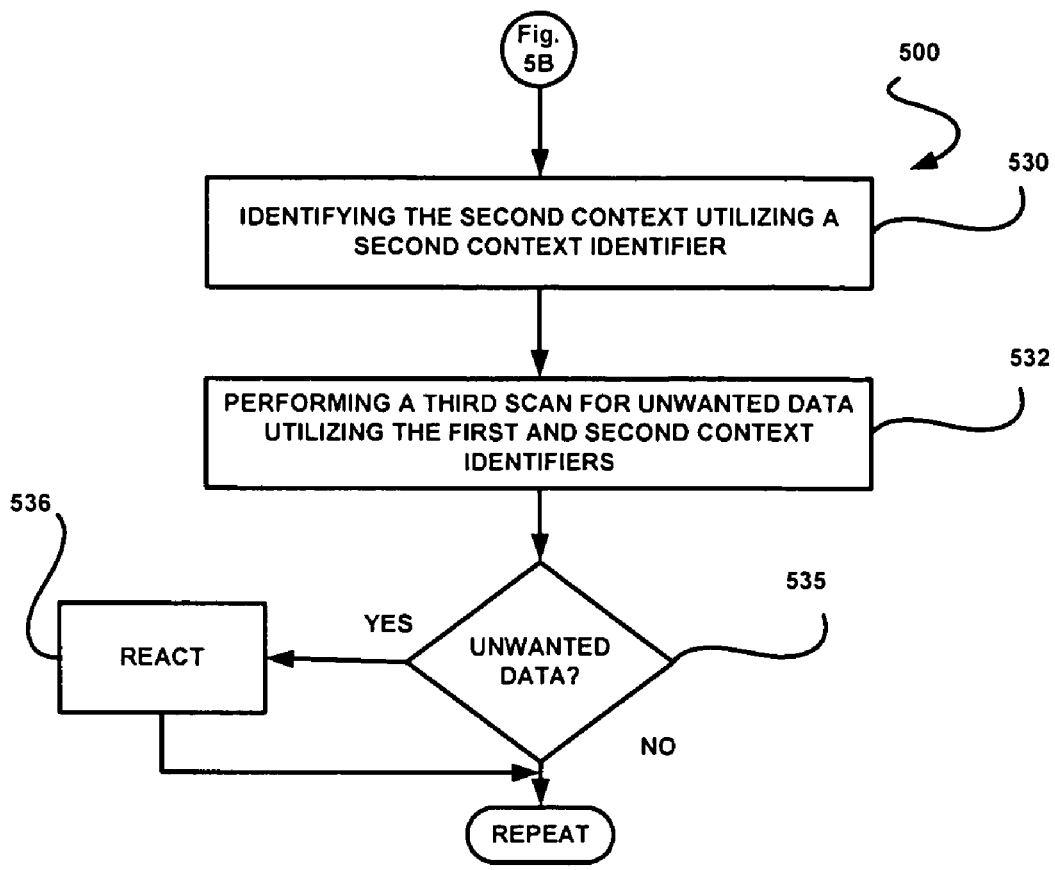

FIGS. 5A-5C illustrate a security method 500 for detecting unwanted data, in accordance with still yet another embodiment. As an option, the present security method 500 may be implemented in the context of the architecture, environment and/or context of FIGS. 1, 2, 3 and/or 4. Of course, however, the security method 500 may be carried out in any desired environment and/or context.

In use, operation of an on-access scanner is provided. With reference first to FIG. 5A, the security method 500 identifies whether data is accessed in operation 502. If data is accessed, a first scan in performed for unwanted data in operation 505. In the event that unwanted data is found during the scan in operation 506, the security method 500 reacts in operation 508. Such reaction may take any form including, but not limited to a quarantine operation, an alert, a cleaning operation, log reporting, etc.

Regardless as to whether unwanted data is found during the first scan in operation 506, the security method 500 continues as set forth below. Specifically, the behavior of the data is monitored in any desired manner. Note operation 510. For example, the behavior may be monitored by running a scan, comparing the behavior against a predetermined set of rules, etc. More information on exemplary rules may be found in application Ser. No. 10/876,524 filed Jun. 24, 2004, and which is incorporated herein by reference for all purposes.

Further during operation 510, a first context is determined based on such monitoring. Such context may be determined in the same manner discussed hereinabove, or in any manner for that matter. While, in the present embodiment, the context is described as being determined in operation 510 et al., it should be understood that the context may be determined in any desired operation so that such context may be used at any point in method 500 for the purpose of improving the detection of unwanted data. For example, a context may be determined in operation 505 for use during decision 506.

Also based on the monitoring, it is decided whether the behavior of the data should be controlled. See decision 512. Optionally, this determination may be made based on whether the behavior monitored in operation 510 matched at least one of the predetermined rules, etc. mentioned above. If the behavior does not need to be controlled, the security method 500 may return to operation 510.

If, however, the behavior is to be controlled per decision 512, such control may include, but is not limited to blocking the behavior, altering the same, etc. Note operation 514. More information on exemplary rules and related behavior controlling techniques may be found in application Ser. No. 10/876, 524 filed Jun. 24, 2004, and which is incorporated herein by reference for all purposes.

Referring now to FIG. 5B, after the behavior is controlled in operation 514, the first context determined in operation 510 is identified utilizing a first context identifier. Note operation 515 in FIG. 5B. It should be understood that the order of operation 515 with respect to the other operations is not critical, as the first context identifier may be identified at any desired, feasible point during security method 500 to more easily identify such specific first context.

Next, in operation 516, a second scan is performed for unwanted data utilizing the first context identifier. This may optionally be carried out in the manner set forth hereinabove. In the event that unwanted data is found during the second scan per decision 518, the security method 500 may react in operation 520 in a manner similar to operations 508.

Regardless of whether unwanted data is found per decision 518, the behavior of the data is monitored such that a second context is determined. See operation 522. Based on such monitoring, it is decided whether the behavior of the data must be controlled in decision 525. If the behavior does not need to be controlled, the security method 500 returns to operation 522, otherwise the behavior is controlled in operation 526. As an option, operations 522-526 may be carried out in a manner similar to operations 510-514 described hereinabove.

Turning now to FIG. 5C, after the behavior is controlled in operation 526, the second context determined in operation 522 is identified using a second context identifier. Note operation 530. Then, a third scan is performed for unwanted data utilizing the first and second context identifiers in operation 532. In the event that unwanted data is found during the third scan per operation 535, the security method 500 may react in operation 536, as described previously.

Next, regardless of whether unwanted data is found per decision 535, the security method 500 may repeat in the spirit of the method 400 of FIG. 4, thereby collecting additional context identifiers for improved detection of unwanted data.

To provide a detailed example of the method 500 of FIGS. 5A-5C, as described above, a specific flow is provided in Table 1 of a security method for detecting unwanted data. It should be noted that such flow is set forth for illustrative purposes only, and should not be construed as limiting in any manner.

TABLE 1

1) User tries to start <CouldBeNasty.exe>
2) On-Access scanner scans CouldBeNasty.exe, the engine decides it is clean and the on-access scanner (OAS) allows CouldBeNasty.exe to run
3) CouldBeNasty.exe writes data to HKLM\Software\Windows\Run
4) Registry monitoring rule triggers and blocks the change, and informs the OAS that it happened; "ContextID = 205" is established based on the current context
5) OAS scans CouldBeNasty.exe again, this time including "ContextID = 205"; the engine decides again that it is clean
6) CouldBeNasty.exe now opens port 25
7) Network monitoring rule triggers and blocks the attempt to open the port and tells the OAS that it happened; "ContextID = 59" is established based on the current context
8) OAS scans CouldBeNasty.exe again, this time including "ContextID = 205" and "ContextID = 59"; with all this extra information, the engine and signatures decide that this is a "new mass-mailing worm"; the process is terminated, the user informed and a sample is sent to a virus signature service provider (i.e. McAfee ®, etc.) so that an exact signature can be generated In one embodiment, terrorism may be countered utilizing the aforementioned technology. According to the U.S. Federal Bureau of Investigation, cyber-terrorism is any "premeditated, politically motivated attack against information, computer systems, computer programs, and data which results in violence against non-combatant targets by subnational groups or clandestine agents." A cyber-terrorist attack is designed to cause physical violence or extreme financial harm. According to the U.S. Commission of Critical Infrastructure Protection, possible cyber-terrorist targets include the banking industry, military installations, power plants, air traffic control centers, and water systems. Thus, by optionally incorporating the present technology into the cyber-frameworks of the foregoing potential targets, terrorism may be countered by preventing the infection thereof with malware, which may potentially cause extreme financial harm.

While various embodiments have been described above, it should be understood that they have been presented by way of example only, and not limitation. For example, any of the network elements may employ any of the desired functionality set forth hereinabove. Thus, the breadth and scope of a preferred embodiment should not be limited by any of the above-described exemplary embodiments, but should be defined only in accordance with the following claims and their equivalents.

What is claimed is:

1. A security method for detecting unwanted data, comprising:
    performing a scan for unwanted data to generate results of the scan;
    identifying a context of the scan for the unwanted data utilizing a state machine; and
    conditionally indicating the presence of the unwanted data based on both the results of the scan and the context of the scan;
    wherein the context of the scan is identified utilizing a unique context identifier which is separate from the context of the scan and is capable of being used to identify the context of the scan during subsequent scans;
    wherein the scan involves comparing a plurality of signatures with data;
    wherein the signatures include heuristic signatures;
    wherein the context of the scan is utilized permitting a wider range of the heuristic signatures, without increasing instances of false detections;
    wherein a sample of the unwanted data is sent to a virus signature service provider so that an exact signature can be generated.

2. The method as recited in claim 1, wherein the plurality of signatures are representative of the unwanted data, and wherein the results indicate whether a match is found.

3. The method as recited in claim 1, wherein the results of the scan and the context of the scan are used in combination to improve a reliability of the detection of the unwanted data.

4. The method as recited in claim 1, wherein the context of the scan reflects behavior over time.

5. The method as recited in claim 1, wherein the context of the scan involves at least one file subject to the scan.

6. The method as recited in claim 1, wherein the context of the scan involves at least one process subject to the scan.

7. The method as recited in claim 1, wherein the context of the scan includes a registry change.

8. The method as recited in claim 1, wherein the context of the scan includes network communication.

9. The method as recited in claim 1, wherein the context of the scan includes user information.

10. The method as recited in claim 1, wherein the context of the scan includes at least one change to at least one file.

11. The method as recited in claim 1, wherein the context of the scan includes information on code execution.

12. The method as recited in claim 1, wherein the context of the scan is used to determine a source of the unwanted data.

13. The method as recited in claim 1, wherein the context of the scan is used to determine a persistence of the unwanted data.

14. The method as recited in claim 1, wherein the context of the scan is used to determine a propagation of the unwanted data.

15. The method as recited in claim 1, wherein the context of the scan is used to determine a stealth aspect of the unwanted data.

16. The method as recited in claim 1, wherein the unwanted data includes potentially unwanted programs.

17. The method as recited in claim 1, wherein the unwanted data includes spyware.

18. The method as recited in claim 1, wherein the unwanted data includes malware.

19. The method as recited in claim 1, wherein the method is utilized to counter terrorism by preventing infection of cyber-frameworks with malware initiated by terrorists.

20. The method as recited in claim 1, wherein the unique context identifier includes a unique identification number.

21. The method as recited in claim 1, wherein when an application writes data to a registry, a registry monitoring rule triggers, which blocks the data from being written to the registry and informs a scanner, where the scanner establishes the unique context identifier based on a current context.

22. The method as recited in claim 1, wherein when an application attempts to open a port, a network monitoring rule triggers, which blocks the attempt to open the port and informs a scanner, where the scanner establishes the unique context identifier based on a current context.

23. The method as recited in claim 1, wherein if the presence of the unwanted data is indicated based on both the results of the scan and the context of the scan, then a process associated with the unwanted data is terminated.

24. The method as recited in claim 1, wherein the context of the scan includes a state related to the scan and the state machine includes anti-virus software.

25. The method as recited in claim 1, wherein the unique context identifier is capable of being used to identify a previous context of at least one prior scan during the subsequent scans.

26. The method as recited in claim 1, wherein the context of the scan includes a context of an entire scan for the unwanted data.

27. A security computer program product embodied on a tangible computer readable medium, comprising:
    computer code for performing a scan for unwanted data to generate results of the scan;
    computer code for identifying a context of the scan for the unwanted data utilizing a state machine; and
    computer code for conditionally indicating the presence of the unwanted data based on both the results of the scan and the context of the scan;
    wherein the security computer program product is operable such that the context of the scan is identified utilizing a unique context identifier which is separate from the context of the scan and is capable of being used to identify the context of the scan during subsequent scans;
    wherein the security computer program product is operable such that the scan involves comparing a plurality of signatures with data;
    wherein the signatures include heuristic signatures;
    wherein the security computer program product is operable such that the context of the scan is utilized permitting a wider range of the heuristic signatures, without increasing instances of false detections;

wherein the security computer program product is operable such that a sample of the unwanted data is sent to a virus signature service provider so that an exact signature can be generated.

28. A security system including a tangible computer readable medium, comprising:
   a scanner for performing a scan for unwanted data to generate results of the scan;
   wherein the security system is operable such that a context of the scan for the unwanted data is identified for conditionally indicating the presence of the unwanted data based on both the results of the scan and the context of the scan;
   wherein the security system is operable such that the context of the scan is identified utilizing a state machine and a unique context identifier which is separate from the context of the scan and is capable of being used to identify the context of the scan during subsequent scans;
   wherein the security system is operable such that the scan involves comparing a plurality of signatures with data;
   wherein the signatures include heuristic signatures;
   wherein the security system is operable such that the context of the scan is utilized permitting a wider range of the heuristic signatures, without increasing instances of false detections;
   wherein the security system is operable such that a sample of the unwanted data is sent to a virus signature service provider so that an exact signature can be generated.

29. A security method for detecting unwanted data, comprising:
   (a) monitoring a behavior of data, wherein a context is identified based on the monitoring;
   (b) determining whether the data includes unwanted data based on the context;
   (c) repeating (a)-(b), wherein additional determinations in operation (b) are based on a plurality of the contexts identified in operation (a);
      wherein the context is identified utilizing a state machine and a unique context identifier which is separate from the context and is capable of being used to identify the context during a scan;
      wherein the scan involves comparing a plurality of signatures with the data;
      wherein the signatures include heuristic signatures;
      wherein the context is utilized permitting a wider range of the heuristic signatures, without increasing instances of false detections;
      wherein a sample of the unwanted data is sent to a virus signature service provider so that an exact signature can be generated.

30. A security method for detecting unwanted data, comprising:
   identifying access to data;
   performing a first scan for unwanted data;
   conditionally permitting access to the data based on the first scan;
   monitoring a behavior of the data, wherein a first context of the first scan is determined based on the monitoring;
   conditionally controlling the behavior of the data based on the monitoring;
   identifying the first context of the first scan utilizing a state machine and a unique first context identifier;
   performing a second scan for the unwanted data utilizing the unique first context identifier;
   conditionally identifying the data as the unwanted data based on the second scan;
   further monitoring the behavior of the data, wherein a second context of the second scan is determined based on the monitoring;
   conditionally controlling the behavior of the data based on the further monitoring;
   identifying the second context of the second scan utilizing a unique second context identifier;
   performing a third scan for the unwanted data utilizing the unique first context identifier and the unique second context identifier; and
   conditionally identifying the data as the unwanted data based on the third scan;
   wherein the unique first context identifier and the unique second context identifier are separate from the first context of the first scan and the second context of the second scan and are capable of being used to identify the first context of the first scan and the second context of the second scan during subsequent scans;
   wherein the first and the second scan involve comparing a plurality of signatures with the data;
   wherein the signatures include heuristic signatures;
   wherein the first context of the first scan and the second context of the second scan are utilized permitting a wider range of the heuristic signatures, without increasing instances of false detections;
   wherein a sample of the unwanted data is sent to a virus signature service provider so that an exact signature can be generated.

* * * * *